(12) United States Patent
Filippovitch (10) Patent No.: US 7,975,342 B2
(45) Date of Patent: Jul. 12, 2011

(54) DEVICE FOR MOVING A PIG THROUGH A CONDUIT, SUCH AS A PIPELINE

(75) Inventor: Sergei Filippovitch, Richmond Hill (CA)

(73) Assignee: PII (Canada) Limited, Calgary (CA)

( * ) Notice: Subject to any disclaimer, the term of this patent is extended or adjusted under 35 U.S.C. 154(b) by 0 days.

(21) Appl. No.: 12/572,767

(22) Filed: Oct. 2, 2009

(65) Prior Publication Data
US 2010/0017980 A1    Jan. 28, 2010

Related U.S. Application Data

(63) Continuation of application No. 11/122,076, filed on May 5, 2005, now Pat. No. 7,614,109.

(30) Foreign Application Priority Data

Sep. 2, 2004 (CA) ........................ 2480534

(51) Int. Cl.
*B08B 9/055* (2006.01)
(52) U.S. Cl. ................................. 15/104.061
(58) Field of Classification Search .............. 15/104.061
See application file for complete search history.

(56) References Cited

U.S. PATENT DOCUMENTS

| | | | |
|---|---|---|---|
| 2,474,690 A * | 6/1949 | Robinson et al. | 403/229 |
| 4,460,920 A | 7/1984 | Weber et al. | |
| 4,715,128 A | 12/1987 | Cummings et al. | |
| 5,080,020 A * | 1/1992 | Negishi | 104/138.2 |
| 5,205,048 A | 4/1993 | Toomey et al. | |
| 6,381,797 B1 | 5/2002 | Filippovitch et al. | |
| 6,538,431 B2 | 3/2003 | Couchman et al. | |
| 7,614,109 B2 * | 11/2009 | Filippovitch | 15/104.061 |

FOREIGN PATENT DOCUMENTS

| | | | |
|---|---|---|---|
| JP | 54-119765 | * | 9/1979 |
| JP | 57-169674 A | | 10/1982 |
| JP | 63-168087 U | | 11/1988 |
| JP | 05-306795 A | | 11/1993 |
| WO | WO 2004/028714 A1 | | 4/2004 |

* cited by examiner

*Primary Examiner* — Laura C Guidotti
(74) *Attorney, Agent, or Firm* — Potomac Patent Group PLLC (57) ABSTRACT

A pig towing device is adapted for movement through a conduit having bends and open T intersections. The pig has a front leading cup and a rear trailing cup adapted to seal with the conduit for propelling the device through the conduit. The leading and trailing cups are spaced apart a predetermined distance to maintain the seal with the conduit as the pig towing device negotiates past the open T intersections. The pig towing device has a flexible body interconnecting the front leading cup and the rear trailing cup. The flexible body is urged normally into a straight position extending along a central axis thereof to maintain the front leading cup and the rear trailing cup spaced apart by the predetermined distance. The flexible body has predetermined limited flexibility permitting it to bend relative to the central axis as the pig towing device negotiates through the bends in the conduit.

27 Claims, 7 Drawing Sheets

DEVICE FOR MOVING A PIG THROUGH A CONDUIT, SUCH AS A PIPELINE

CROSS-REFERENCE TO RELATED APPLICATIONS

This application is a Continuation of, and claims benefit under 35 U.S.C. §120 or 121, to prior-filed, US non-provisional patent application Ser. No. 11/122,076, filed on May 5, 2005 now U.S. Pat. No. 7,614,109, of which is hereby incorporated by reference in its entirety.

FIELD OF THE INVENTION

The present invention relates to pipeline pigs and, in particular relates to a pig towing device.

BACKGROUND OF THE INVENTION

Devices known as pigs are commonly passed through conduit, such as pipelines, in order to service or inspect the pipeline. A pig may contain the necessary servicing or inspection equipment or may draw other devices behind it. In pipelines for conveying fluids, the pig is commonly driven along the pipeline by the flow of the pipeline fluid. To achieve this, the pig is usually fitted with two spaced apart flexible or expandable cups that are attached to a rigid body of the pig and extend outwardly to the interior of the conduit wall. The cups are adapted to provide a sufficient seal in the pipeline permitting the pig to travel at the speed of the pipeline fluid.

In many instances, the pig comprises more than one section with a towing section having an elongated rigid body supporting the expandable cups. The towing section or device pulls other inspection devices through the pipeline. These other inspection devices may also clean the pipeline.

In some instances, pigs may become stuck in pipelines due to bends in the pipeline that have a radius equal to the diameter of the pipeline. In these instances the pig is too long and straight to negotiate the bend in the pipeline. In other instances the pig may become stuck because it loses its seal with the conduit due to openings in the pipeline wall that are larger than the length or distance between cups of the pig. These openings occur where the conduit has intersections with other pipes. These intersections are referred to as full bore T's and Y-connections. In particular the full bore T intersection occurs when a conduit intersects the pipeline at 90 degrees. The pig must be designed to negotiate past both bends and intersections in the pipeline which two factors have opposite requirements for the pig. Clearly a longer pig works better to maintain a seal with the pipeline as it negotiates past open T intersections. On the otherhand, a shorter pig is able to negotiate past bends in the pipeline. Consequently, pipelines having both the bends and intersections can increase the risk of a pig becoming stuck in the pipeline making the pipeline "unpiggable".

At the present time pig towing devices have collapsible multi diameter flexible cups which allow for movement of the cups relative to each other and the axis of the rigid body of the pig towing device to permit the pig towing device to negotiate slight bends in the pipeline. One such pig having a multi diameter flexible cup is disclosed in more detail in my U.S. Pat. No. 6,381,797 issued May 7, 2002. Even so, the multi diameter cups of the pig towing devices must still be spaced sufficiently far enough apart so as to allow each one of the cups to maintain a seal with the conduit as the pig negotiates past intersection openings in the pipeline wall. That is, the cups must be of spaced apart a sufficient distance to permit the trailing cup to push the leading cup via the rigid interconnecting body past the intersection and then permit the leading cup to drag the trailing cup via the rigid interconnecting body past the intersection so that the pig towing device does not become stuck in the pipeline. However, the length of the rigid elongated body interconnecting the two cups still restricts negotiation of the pig towing device around tight bends or curves within the pipeline.

Accordingly, there is a need for the development of a pig towing device which is able to negotiate past intersections within the pipeline as well as being able to negotiate through curves or bends in the pipeline.

SUMMARY OF THE INVENTION

The present invention relates to a pig towing device for moving through a conduit, such as, for example, a pipeline where the conduit has bends and open T intersections. In accordance with the present invention the pig towing device has at least a front leading cup and a rear trailing cup adapted to seal with the conduit for propelling the device through the conduit. The leading cup and the trailing cup are spaced apart a predetermined distance whereby at least one of the leading and trailing cups is adapted to maintain the seal with the conduit as the pig towing device negotiates past the open T intersections. The pig towing device has a flexible body interconnecting the front leading cup and the rear trailing cup. The flexible body is urged normally into a straight position extending along a central axis thereof to maintain the front leading cup and the rear trailing cup spaced apart by the predetermined distance. The flexible body has predetermined limited flexibility permitting it to bend relative to the central axis as the pig towing device negotiates through the bends in the conduit.

By providing a flexible body portion between the cups that is normally urged into a straight position extending along its central axis, the pig is adapted to maintain the cups spaced apart a sufficient distance for the pig to negotiate past open T intersections in the conduit. Further, by having a predetermined limited flexibility, the flexible body is able to bend about its central axis and negotiate through bends in the conduit. The predetermined limited flexibility also prevents the pig from "jack-knifing" the trailing cup relative to the leading cup resulting in the pig becoming stuck in the conduit.

In one embodiment, the flexible body has a first tension means, a flexible compression sleeve means, and a second tension means. The first tension means is connected with both the front leading cup and the rear trailing cup for transferring drag forces from the front leading cup to the rear trailing cup. The flexible compression sleeve means surrounds the first tension means and is sandwiched between the front leading cup and the rear trailing cup for transferring compression forces from the rear trailing cup to the front leading cup. The second tension means is operably connected with one of the first tension means and the flexible compression sleeve means to provide a predetermined tension load that normally urges the flexible body into its straight position extending along the central axis and to limit bending of the flexible body relative to the central axis.

In one embodiment, the rear trailing cup has a first central aperture and the first tension means has a threaded end portion that extends through the first central aperture. The second tension means comprises a compression spring surrounding the threaded end portion and a nut like connector secured to the threaded end portion for engagement with the compression spring. The nut is rotated about the threaded end portion to compress the compression spring against the rear trailing cup thereby providing the predetermined tension load to the first tension means.

In one embodiment, the flexible compression sleeve means comprises a plurality of compressible metallic disk elements stacked adjacent to each other. Each of the compressible metallic disk elements has a central opening throughwhich the first tension means extends whereby relative movement between the compressible metallic disk elements allows the flexible body to bend relative to the central axis.

In another embodiment the second tension means comprises a resilient sleeve of predetermined density adapted to surround the first tension means and spread the first and second cups apart to impart the predetermined tension load onto the first tension means. In this embodiment, the flexible compression sleeve means comprises a series of spaced apart metallic disk elements secured in surrounding relation with the second tension means whereby the spacing between the metallic ring elements limits the bending of the flexible body.

BRIEF DESCRIPTION OF THE DRAWINGS

For a better understanding of the nature and objects of the present invention reference may be had to the accompanying diagrammatic drawings in which.

DETAILED DESCRIPTION OF THE INVENTION

The present invention relates to pipeline pigs and, in particular relates to a pig towing device.

Referring to FIGS. 1 to 3 and 5a through 5d, there is shown the pig towing device 10 for moving through conduit 12. The pig towing device 10 has a front leading cup 14 and a rear trailing cup 16 separated by a flexible body 18. The front and rear cups 14 and 16 are multi diameter cups. That is the cups 14 and 16 are adapted to flex relative to the inside diameter "Dp" of the conduit 12. This is accomplished by each of the cups 14 and 16 having a central portion or hub 20 to which pivotal levers 22 are pivotally connected and have at their end a roller 24 for engaging the inside wall 13 of the conduit 12. The levers 22 are further provided with brackets 26 which holds the disk shaped cup portion 28 of the cups 14 and 16. The levers 22 are urged outwardly to bring the rollers 24 into engagement with the inside wall 13 of the conduit or pipeline 12 and provide a sufficient seal between the cups 14, 16 and the inside wall 13 of conduit 12. A more detailed description of the multi diameter cups can be found in my U.S. Pat. No. 6,381,797 issued May 9, 2002. The cups 28, in response the fluid flowing through the pipeline 12 engaging the cups, propel the pig towing device 10 along the pipeline 12 in the direction shown by arrow 32 (See FIG. 1).

The flexible body 18 interconnects the front leading cup 14 and the rear trailing cup 16. The flexible body 18 normally extends straight along its central axis 34 that extends through the flexible body 18 and the cups 14 and 16. The flexible body 18 maintains the cups 14 and 16 a predetermined axial distance "D" apart. The distance "D" is chosen to permit the pig 10 to negotiate past the open T intersections 200 in the conduit 12.

Figure 1:
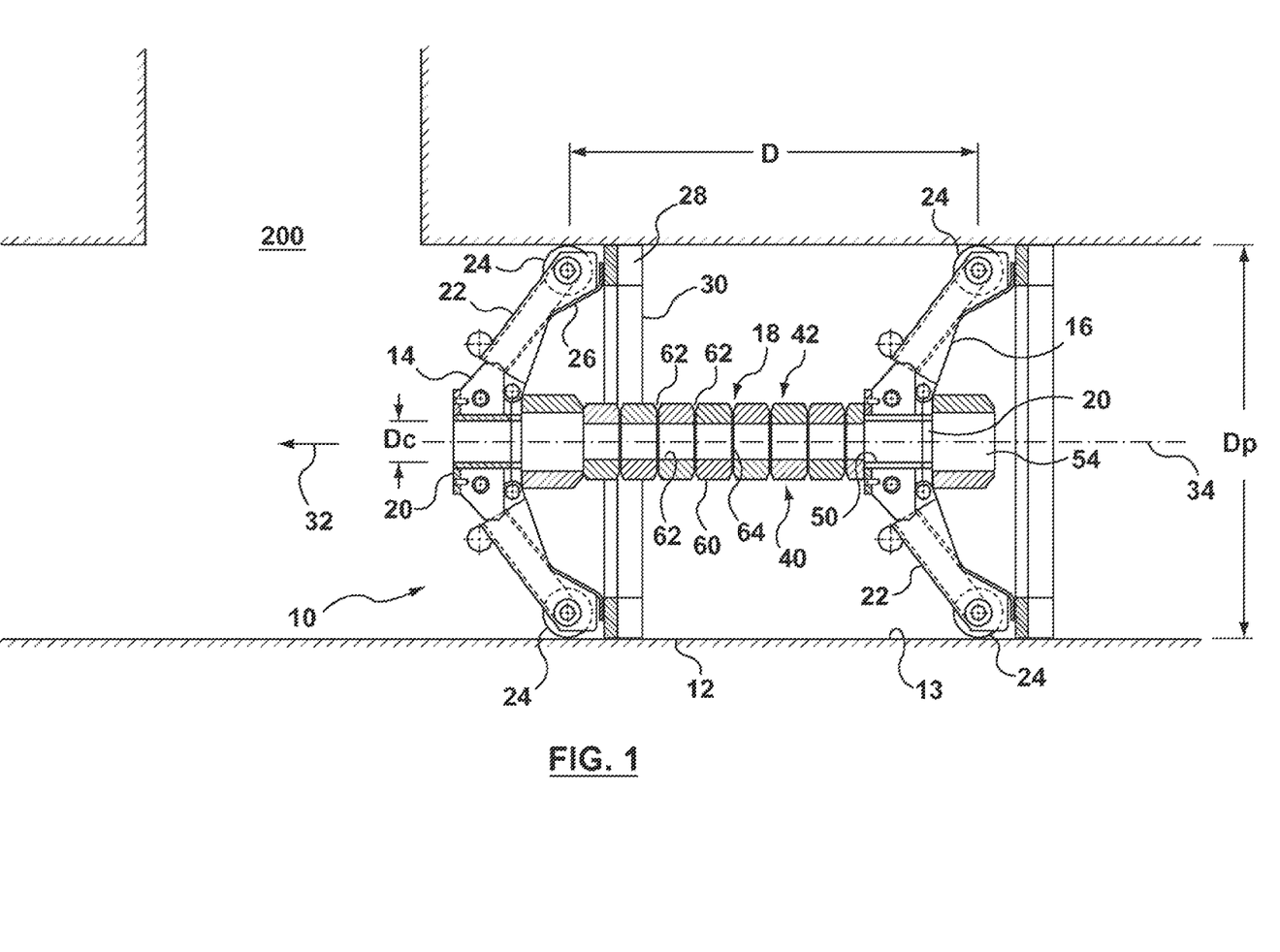
FIG. 1 is a sectional view of the pig towing device of the present invention shown in a portion of a pipeline.
Figure 2:
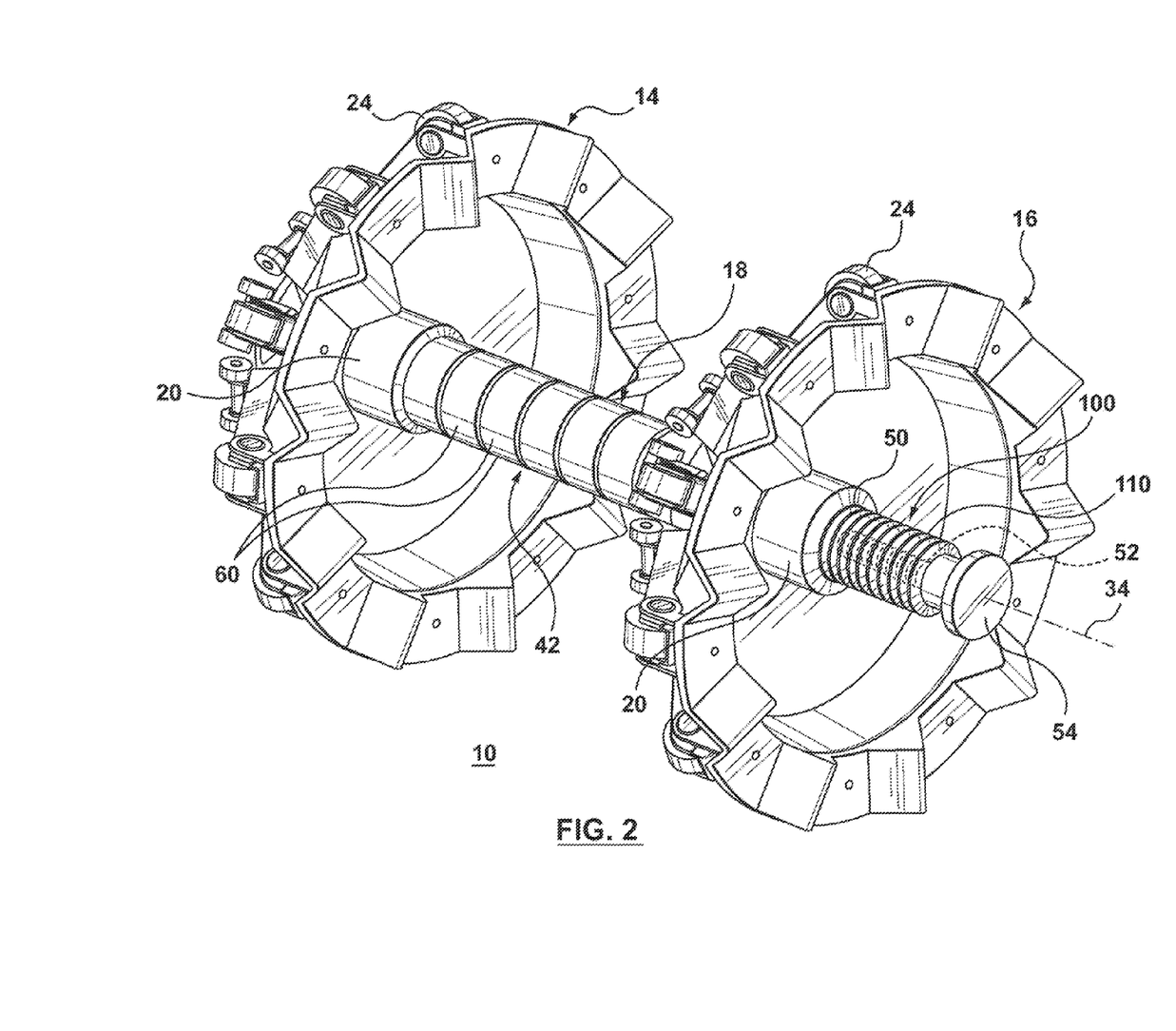
FIG. 2 is an enlarged perspective view of an embodiment of the pig towing device of the present invention.
Figure 3:
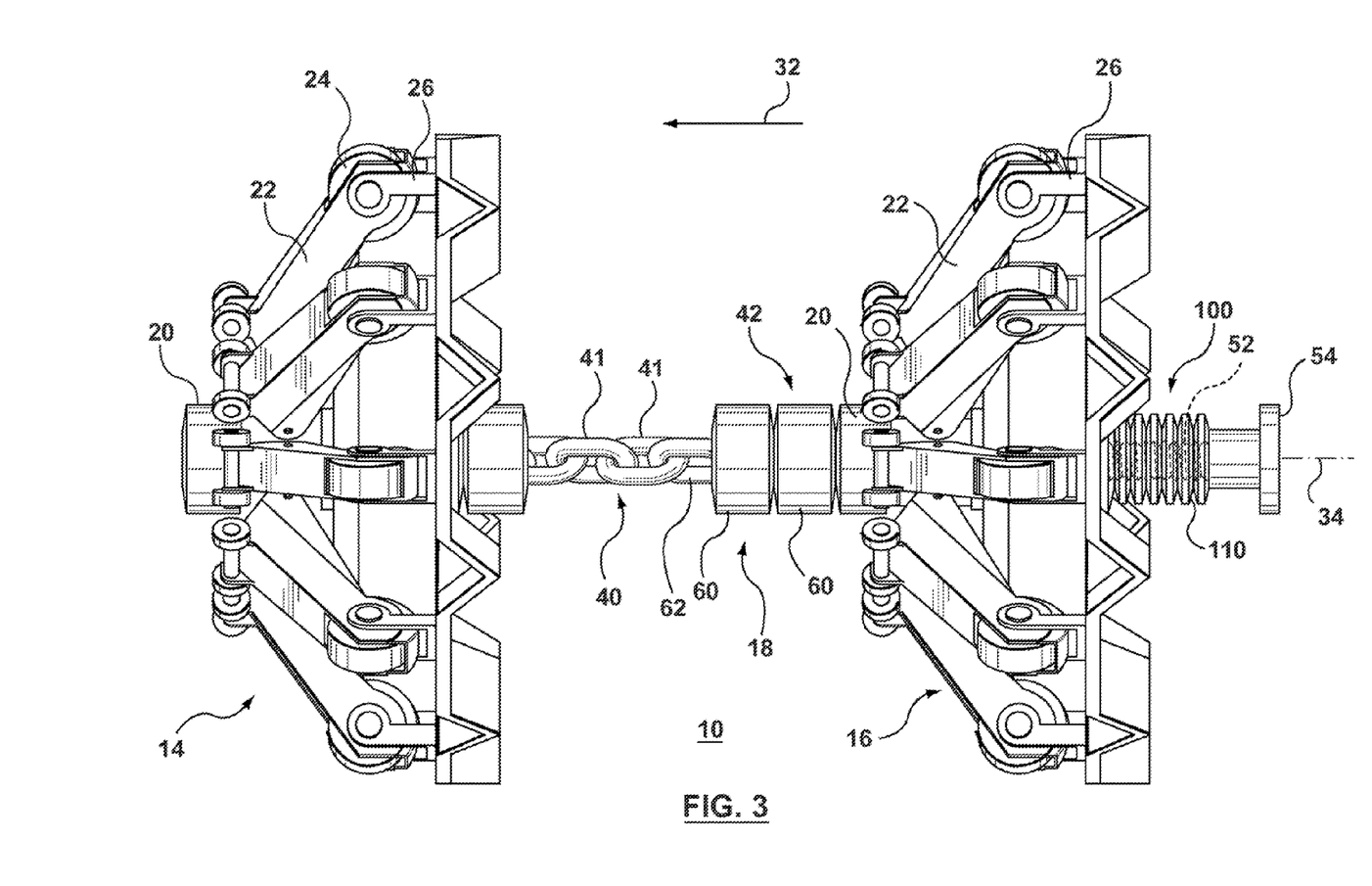
FIG. 3 is another perspective view of the pig towing device of FIG. 2 showing a portion of the flexible compression sleeve means removed.

In FIG. 3, the flexible body 18 is shown to have a first tension means 40 in the form of a chain having links 41. It should be understood that this first tension means 40 may alternatively be a wire rope. The flexible body 18 also has a flexible compression sleeve means 42 surrounding the first tension means 40. In this embodiment, the sleeve means 42 comprises a series of metallic disk elements 60 which are described in more detail hereinafter. In FIG. 3, some of the metallic disk elements 60 have been removed for illustrative purposes to show the chain links 41 of the first tension means 40. It should be understood that the flexible compression sleeve means 42 extends between the cups 14 and 16 as shown in FIGS. 1 and 2. The first tension means 40 and the flexible compression sleeve means 42 are adapted to bend relative to the central axis 34. The first tension means 40 normally extends along the central axis 34 and is attached to the front leading cup 14 at hub 20 and to the rear trailing cup 16. The first tension means 40 transfers any drag forces from the front leading cup 14 to the rear trailing cup 16. The flexible compression sleeve means 42 transfers compression forces from the rear trailing cup 16 to the front leading cup 14.

In the embodiment shown in FIGS. 2 and 3, the rear trailing cup 16 has a central aperture 50 and the first tension means 40 has a threaded end portion 52 (FIGS. 2 and 3) that extends from the chain links 41 through the first central aperture 50 (FIG. 1). In the embodiment of FIG. 1, a tightening nut 54 is shown to engage the threaded end portion 52. In the embodiment shown for FIGS. 2 and 3, the flexible body 18 includes a second tension means 100 in the form of a compression spring 110 surrounding the threaded end portion 52. The compression spring 110 is shown to comprise a plurality of spring washers. It should be understood that any suitable compression spring may be used, such as, for example, a helical coil spring. The compression spring 110 is held over the threaded end portion 52 by the tightening nut 54. As the nut 54 is rotated in a clockwise direction about the threaded end portion 52, it engages the compression spring 110 compressing the compression spring 110 against the hub 20 of the rear trailing cup 16. This causes the compression spring 110 to exert a predetermined tension load on the first tension means 40. Hence the tightening nut 54 together with the properties of the compression spring 110 controls the tension load applied to the flexible body 18. The predetermined tension load results in the urging of the flexible body member 18 into its normally straight position shown in FIGS. 1 through 3 and limits the bending moment of the flexible body 18 relative to the central axis 34 as the pig 10 negotiates through bends in the pipeline 12 as shown in FIGS. 5a to 5d. Of course, the nut 54 may be loosened to reduce tension load on the flexible body 18 and thereby increase bending moment of the flexible body 18 about axis 34.

In the embodiments shown in FIGS. 1 through 3, the flexible compression sleeve means 42 comprises a plurality or a series of rigid of metallic disks elements 60 stacked adjacent to each other. Each of the disk elements 60 has a second central aperture or opening 62 through which the chain links 41 extend. Each of the disk elements 60 has an outside diameter "Dc" which is less than the inside diameter Dp of the conduit 12. In the embodiment shown in FIG. 1, the disk elements 60 have radial end corners 62 that taper to provide an angled effect which facilitates flexing or bending between adjacent the disk elements 60. It should be understood that adjacent disk elements 60 may also be beveled along their sides to permit the desired bending angle between these adjacent disk elements 60. The amount of tension applied by the first tension means 40 by the compression spring 110 results in the compression of the disk elements 60 and hence limits the bending moment of the flexible body 18.

Figure 4A:
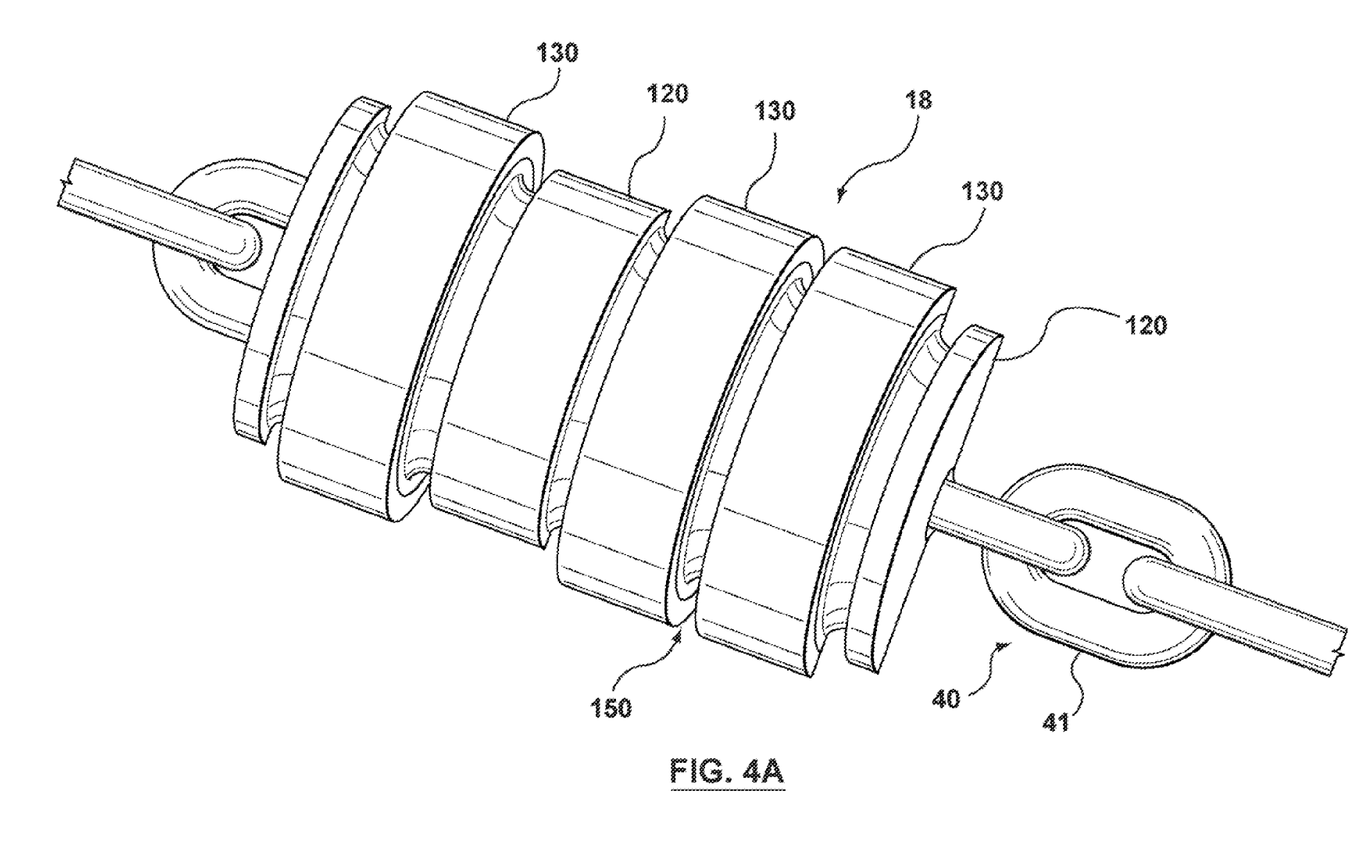
FIGS. 4A and 4B are partial perspective views of another embodiment of the pig towing device of the present invention; and, FIGS. 5A through 5D are views of the pig towing device negotiating back to back bends in a pipeline.
Figure 4B:
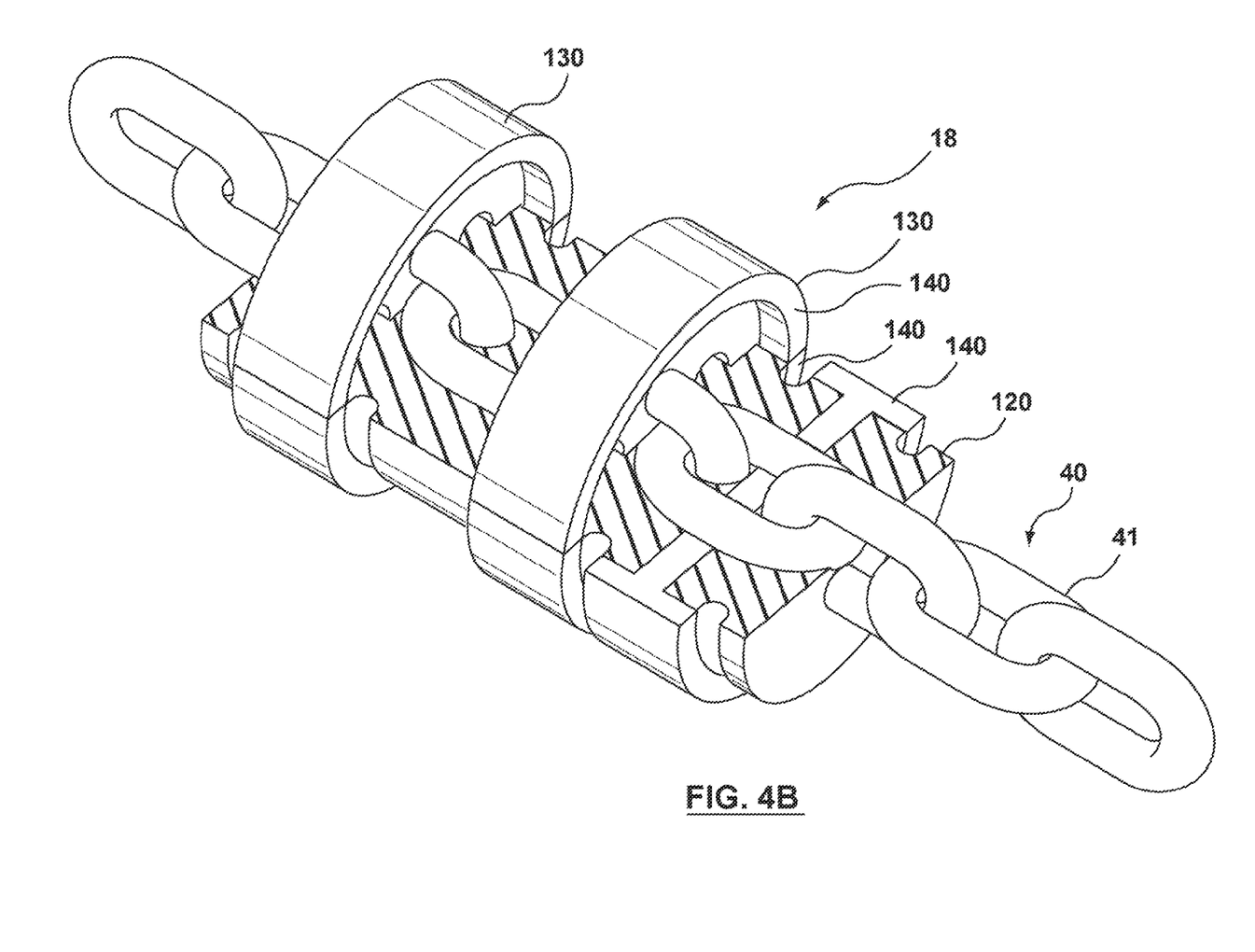

Referring now to FIGS. 4A and 4B there is shown an alternative embodiment for the flexible body 18. In both these Figures, a portion of the flexible body 18 have been removed to better illustrate the components of the flexible body 18. In this embodiment, the first tension means 40 comprises chain links 41. The second compression means 100 comprises a unitary resilient body 120. The unitary resilient body 120 preferably comprises a urethane material molded to the shape shown in the drawings and surrounding the first tension means 40. The density of the body 120 of urethane controls the resiliency of the body 120. The resilient characteristic of the body 120 together with the relative length of the body 120 to that of the first tension means 40 acts to spread the leading and trailing cups 14, 16 apart and places a predetermined tension load on the first tension means 40. In this embodiment, the flexible tension means 42 compresses a series of spaced apart metal ring elements. 130 having a T shaped cross section across the ring. The stem of the T is connected with the resilient body 120 and the space 150 between the ring elements controls the bending angle of the flexible body 18. In this embodiment, the ring elements 130 comprise tow half sections 140 assembled to the resilient body 120. The predetermined tension load limits the bending moment of the flexible body 18, while the ring elements 130 and their mutually adjacent spacing 150 limits the bending angle. It should be understood that while the preferred resilient material is a urethane, any suitable plastic or rubber like material may be utilized.

Figure 5A:
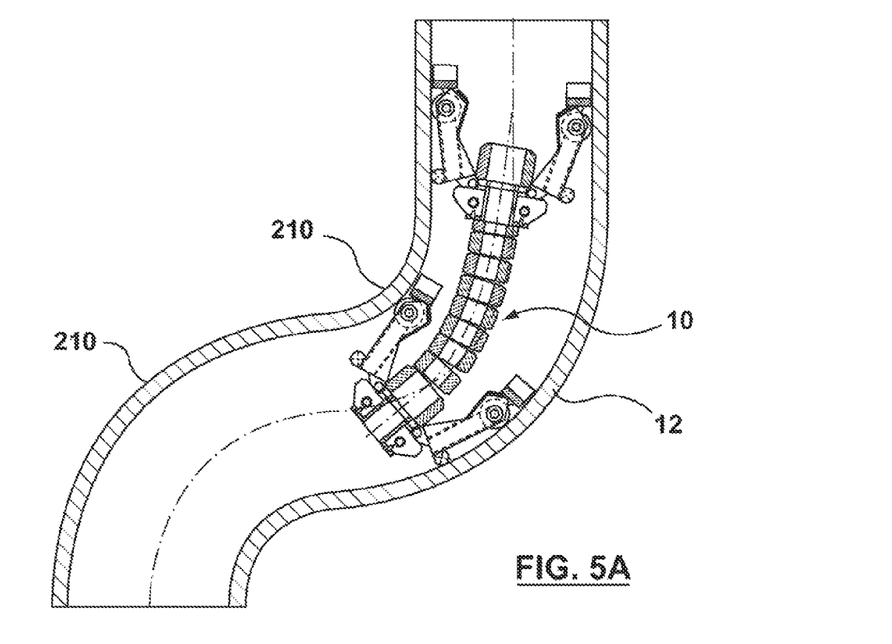
Figure 5B:
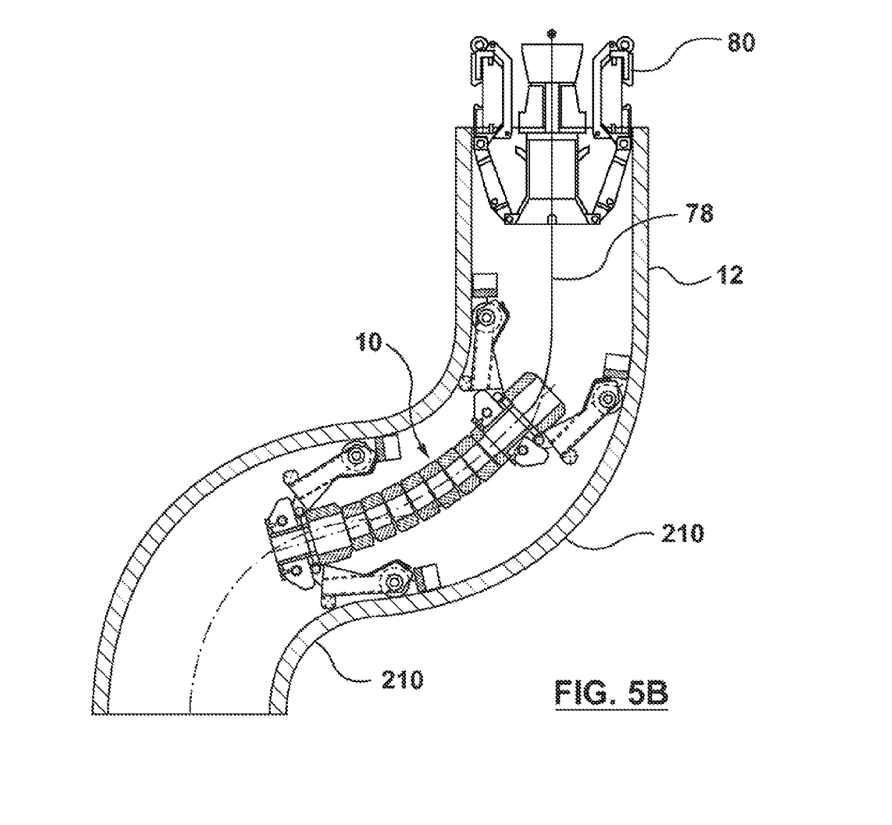
Figure 5C:
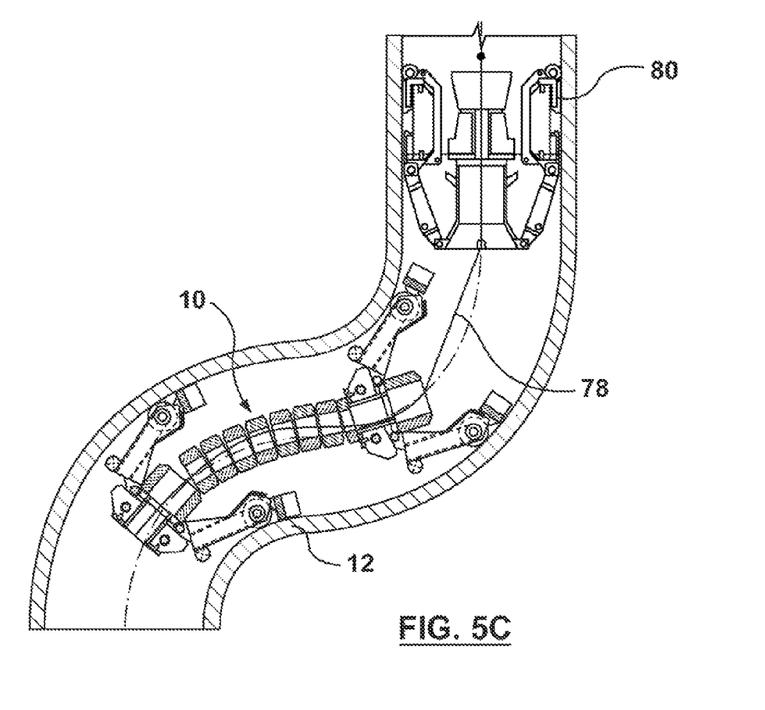
Figure 5D:
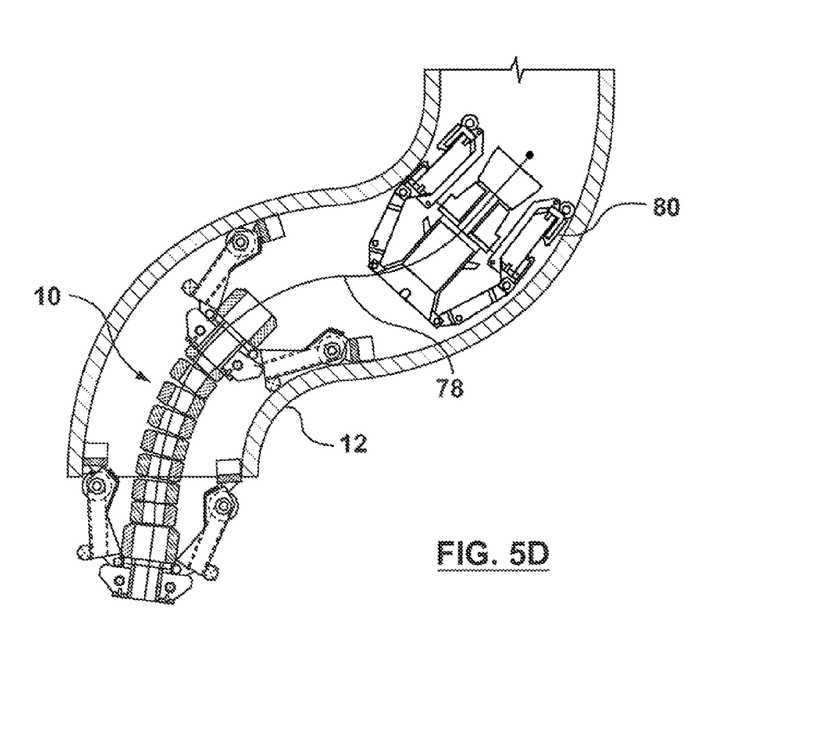

Referring to FIGS. 5A through 5D, there is shown the movement of the pig towing device 10 of the present invention through back to back bends 210 in a pipeline or conduit 12. As the pig towing device 10 negotiates the bends 210 in pipeline 12, it is apparent that the leading cup 14 has changed its diameter to accommodate for the bends. Further, the flexible body 18 also bends around the central axis 34. This bending motion is shown for the pig towing device to be in one direction in FIG. 5A and as the pig towing device negotiates through the bend through FIGS. 5A, 5B, 5C and 5D the pig towing device will then start to bend in other directions as shown in FIGS. 5C and 5D. Attached to the pig towing device by wire 78 is a pig inspection section 80 which may be used to either clean the conduit or take ultrasound or magnetic resonance measurements to determine the integrity of the conduit wall of the pipeline 12.

In the practice of the present invention, the leading cup 14 and the trailing cup 16 each maintain a seal with the inside surface of the pipeline 12 to propel the pig towing device 10 through the conduit 12. Further, the trailing cup 16 is typically provided with openings that allow controlled amounts of fluid to pass through the trailing cup 16 and drive the leading cup 14. These openings and this practice are well known in the art. As the leading cup 14 negotiates past on open T intersection 200 (see FIG. 1) in the pipeline and loses its seal, the trailing cup 16 has sufficient pressure exerted by the fluid in the pipeline to push the leading cup 14 past the open T intersection 200 until the leading cup 14 once again seals with the inside surface of the conduit.

While the invention has been described in connection with what is presently considered to be a practical embodiment, it is to be understood that the invention is not limited thereto, but on the contrary, is intended to cover various modifications and equivalent arrangements included within the spirit and scope of the appended claims.

What is claimed is:

1. A pig towing device adapted for moving through a conduit having bends and open T intersections, the device comprising:
   at least a front leading cup and a rear trailing cup adapted to seal with the conduit for propelling the device through the conduit, the leading cup and the trailing cup being spaced apart a predetermined distance whereby at least one of the leading and trailing cups is adapted to maintain the seal with the conduit as the pig towing device negotiates past the open T intersections, and
   a flexible body interconnecting the front leading cup and the rear trailing cup, the flexible body being urged normally into a straight position extending along a central axis thereof to maintain the front leading cup and the rear trailing cup spaced apart by the predetermined distance, and the flexible body having predetermined limited flexibility permitting it to bend relative to the central axis as the pig towing device negotiates through the bend in the conduit,
   wherein the flexible body has a first tension means and a flexible compression sleeve means,
   the first tension means is connected with both the front leading cup and the rear trailing cup for transferring drag forces from the front leading cup to the rear trailing cup,
   the flexible compression sleeve means surrounds the first tension means and is sandwiched between the front leading cup and the rear trailing cup for transferring compression forces from the rear trailing cup to the front leading cup, and
   the flexible compression sleeve means includes a series of metallic disk elements stacked adjacent to each other, and
   at least a unitary resilient body interposed between two metallic disk elements.

2. The pig towing device of claim 1, wherein the at least unitary resilient body includes urethane material.

3. The pig towing device of claim 1, further comprising:
   a second tension means which is operably connected with one of the first tension means and the flexible compression sleeve means to provide a predetermined tension load that normally urges the flexible body into its straight position extending along the central axis and limits bending of the flexible body relative to the central axis.

4. The pig towing device of claim 3, wherein the rear trailing cup has a first central aperture, the first tension means has a threaded end portion, and the second tension means includes a compression spring surrounding the threaded end portion that extends through the first central aperture and a nut like connector secured to the threaded end portion for engagement with the compression spring.

5. The pig towing device of claim 4, wherein the nut is configured to being rotated about the threaded end portion to compress the compression spring against the rear trailing cup thereby providing the predetermined tension load to the first tension means.

6. The pig towing device of claim 1, wherein each of the metallic disk elements has a central opening through which the first tension means extends whereby relative movement between the metallic disk elements allows the flexible body to bend relative to the central axis.

7. The pig towing device of claim 1, wherein the first tension means is one selected from the group of a wire, rope and a chain.

8. The pig towing device of claim 1, wherein the front leading cup and the rear trailing cup are cup shaped multi-diameter members.

9. The pig towing device of claim 1, wherein each of the metallic disk elements has radial end corner portions shaped to limit relative bending movement between adjacent metallic disk elements.

10. The pig towing device of claim 1, wherein each of the metallic disk elements has radial end corner portions and rounded side portions shaped to limit relative bending movement between adjacent metallic disk elements.

11. A pig towing device adapted for moving through a conduit having bends and open T intersections, the device comprising:
   at least a front leading cup and a rear trailing cup adapted to seal with the conduit for propelling the device through the conduit, the leading cup and the trailing cup being spaced apart a predetermined distance whereby at least one of the leading and trailing cups is adapted to maintain the seal with the conduit as the pig towing device negotiates past the open T intersections, and
   a flexible body interconnecting the front leading cup and the rear trailing cup, the flexible body being urged normally into a straight position extending along a central axis thereof to maintain the front leading cup and the rear trailing cup spaced apart by the predetermined distance, and the flexible body having predetermined limited flexibility permitting it to bend relative to the central axis as the pig towing device negotiates through the bend in the conduit,
   wherein the flexible body has a first tension means and a flexible compression sleeve means,
   the first tension means is connected with both the front leading cup and the rear trailing cup for transferring drag forces from the front leading cup to the rear trailing cup,
   the flexible compression sleeve means surrounds the first tension means and is sandwiched between the front leading cup and the rear trailing cup for transferring compression forces from the rear trailing cup to the front leading cup,
   the flexible compression sleeve means includes a series of metallic disk elements stacked adjacent to each other, and
   the flexible compression sleeve means includes plural resilient bodies molded to have a circumferential groove that allows the bodies to bend.

12. The pig towing device of claim 11, wherein the plural resilient bodies are interlaced with the series of metallic disk elements.

13. The pig towing device of claim 11, further comprising:
   a second tension means which is operably connected with one of the first tension means and the flexible compression sleeve means to provide a predetermined tension load that normally urges the flexible body into its straight position extending along the central axis and limits bending of the flexible body relative to the central axis.

14. The pig towing device of claim 11, wherein each of the metallic disk elements has a central opening through which the first tension means extends whereby relative movement between the metallic disk elements allows the flexible body to bend relative to the central axis.

15. The pig towing device of claim 11, wherein the first tension means is one selected from the group of a wire, rope and a chain.

16. The pig towing device of claim 11, wherein the front leading cup and the rear trailing cup are cup shaped multi-diameter members.

17. The pig towing device of claim 11, wherein each of the metallic disk elements has radial end corner portions shaped to limit relative bending movement between adjacent metallic disk elements.

18. The pig towing device of claim 11, wherein each of the metallic disk elements has radial end corner portions and rounded side portions shaped to limit relative bending movement between adjacent metallic disk elements.

19. A pig towing device adapted for moving through a conduit having bends and open T intersections, the device comprising:
   at least a front leading cup and a rear trailing cup adapted to seal with the conduit for propelling the device through the conduit, the leading cup and the trailing cup being spaced apart a predetermined distance whereby at least one of the leading and trailing cups is adapted to maintain the seal with the conduit as the pig towing device negotiates past the open T intersections, and
   a flexible body interconnecting the front leading cup and the rear trailing cup, the flexible body being urged normally into a straight position extending along a central axis thereof to maintain the front leading cup and the rear trailing cup spaced apart by the predetermined distance, and the flexible body having predetermined limited flexibility permitting it to bend relative to the central axis as the pig towing device negotiates through the bend in the conduit,
   wherein the flexible body has a first tension means and a flexible compression sleeve means,
   the first tension means is connected with both the front leading cup and the rear trailing cup for transferring drag forces from the front leading cup to the rear trailing cup,
   the flexible compression sleeve means surrounds the first tension means and is sandwiched between the front leading cup and the rear trailing cup for transferring compression forces from the rear trailing cup to the front leading cup,
   the flexible compression sleeve means includes a series of metallic disk elements stacked adjacent to each other, and
   at least one of the metallic disk elements has a T-shaped cross section.

20. The pig towing device of claim 19, further comprising:
   a second tension means which is operably connected with one of the first tension means and the flexible compression sleeve means to provide a predetermined tension load that normally urges the flexible body into its straight position extending along the central axis and limits bending of the flexible body relative to the central axis.

21. The pig towing device of claim 19, wherein each of the metallic disk elements has a central opening through which the first tension means extends whereby relative movement between the metallic disk elements allows the flexible body to bend relative to the central axis.

22. The pig towing device of claim 19, wherein the first tension means is one selected from the group of a wire, rope and a chain.

23. The pig towing device of claim 19, wherein the front leading cup and the rear trailing cup are cup shaped multi-diameter members.

24. The pig towing device of claim 19, wherein each of the metallic disk elements has radial end corner portions shaped to limit relative bending movement between adjacent metallic disk elements.

25. The pig towing device of claim 19, wherein each of the metallic disk elements has radial end corner portions and rounded side portions shaped to limit relative bending movement between adjacent metallic disk elements.

26. A pig towing device adapted for moving through a conduit having bends and open T intersections, the device comprising:
    at least a front leading cup and a rear trailing cup adapted to seal with the conduit for propelling the device through the conduit, the leading cup and the trailing cup being spaced apart a predetermined distance whereby at least one of the leading and trailing cups is adapted to maintain the seal with the conduit as the pig towing device negotiates past the open T intersections, and
    a flexible body interconnecting the front leading cup and the rear trailing cup, the flexible body being urged normally into a straight position extending along a central axis thereof to maintain the front leading cup and the rear trailing cup spaced apart by the predetermined distance, and the flexible body having predetermined limited flexibility permitting it to bend relative to the central axis as the pig towing device negotiates through the bend in the conduit,
    wherein the flexible body has a first tension mechanism and a flexible compression sleeve,
    the first tension mechanism is connected with both the front leading cup and the rear trailing cup for transferring drag forces from the front leading cup to the rear trailing cup,
    the flexible compression sleeve surrounds the first tension mechanism and is sandwiched between the front leading cup and the rear trailing cup for transferring compression forces from the rear trailing cup to the front leading cup,
    the flexible compression sleeve includes a series of metallic disk elements stacked adjacent to each other, and
    at least a unitary resilient body interposed between two metallic disk elements.

27. The pig towing device of claim 26, wherein the at least unitary resilient body includes a plastic or rubber material.

* * * * *